Oct. 14, 1969　　　　T. J. DUNN　　　　3,472,006
MOWING APPARATUS
Filed Jan. 24, 1967　　　　　　　　　　6 Sheets-Sheet 1

INVENTOR
THOMAS J. DUNN
BY Robert G. McMorrow
ATTORNEY

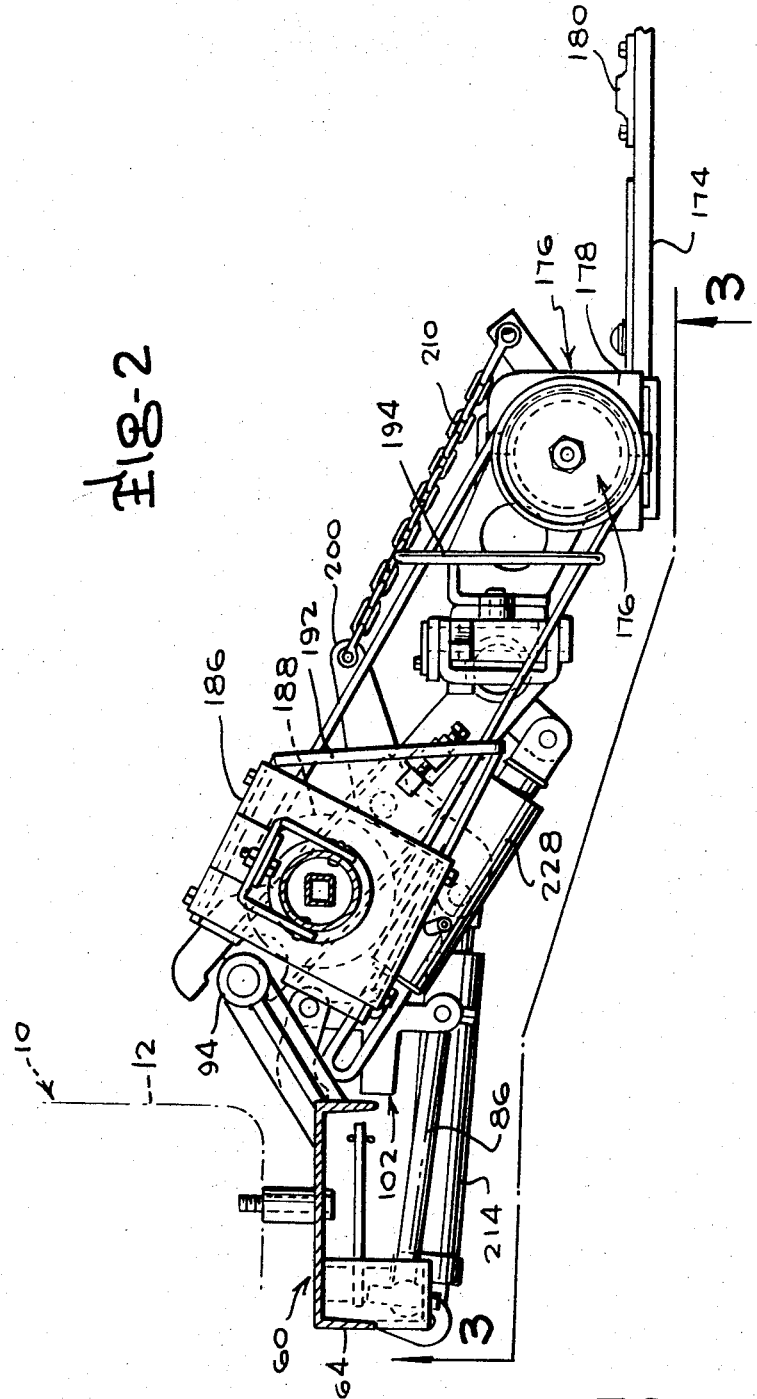

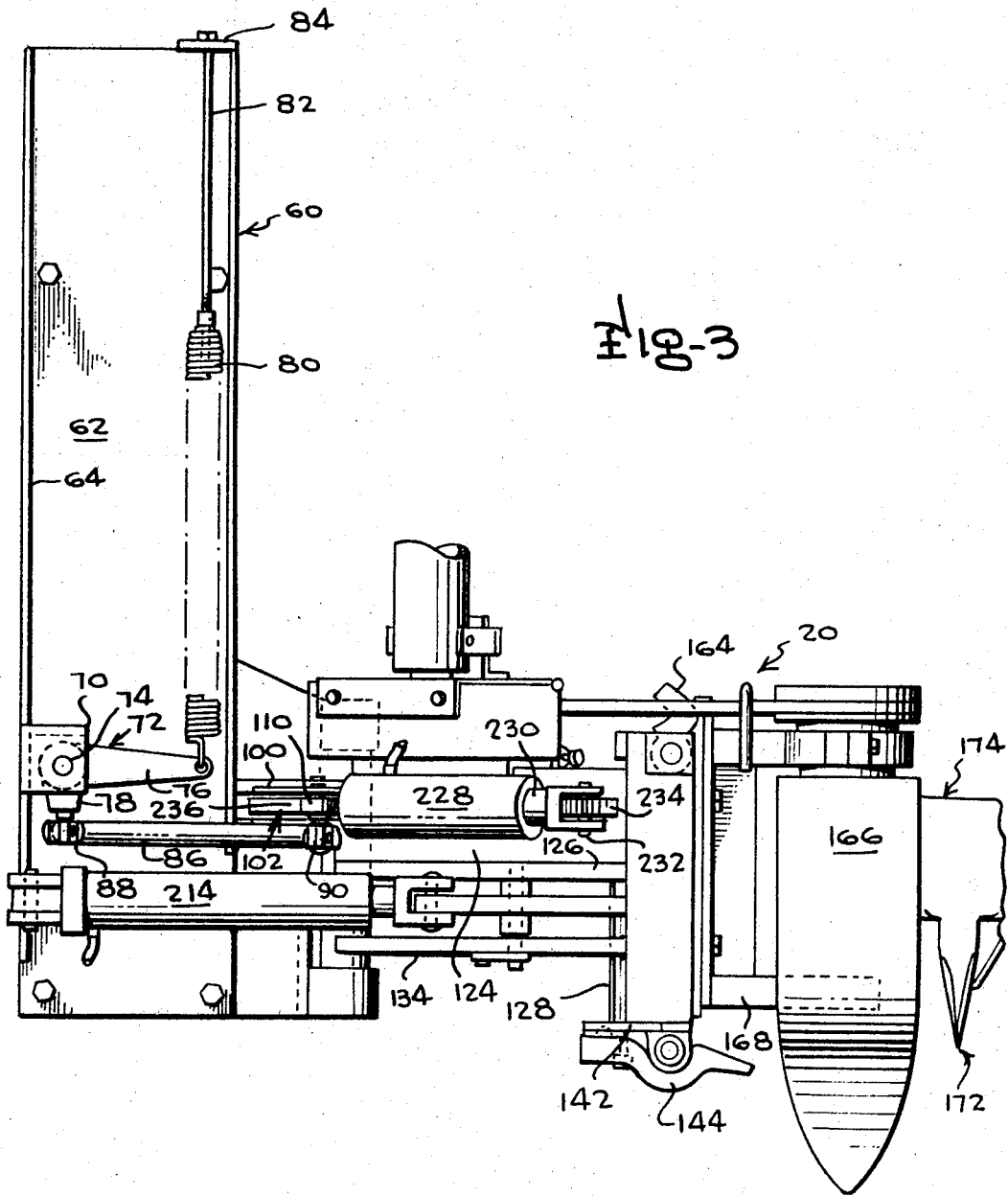

Oct. 14, 1969     T. J. DUNN     3,472,006
MOWING APPARATUS
Filed Jan. 24, 1967     6 Sheets-Sheet 4
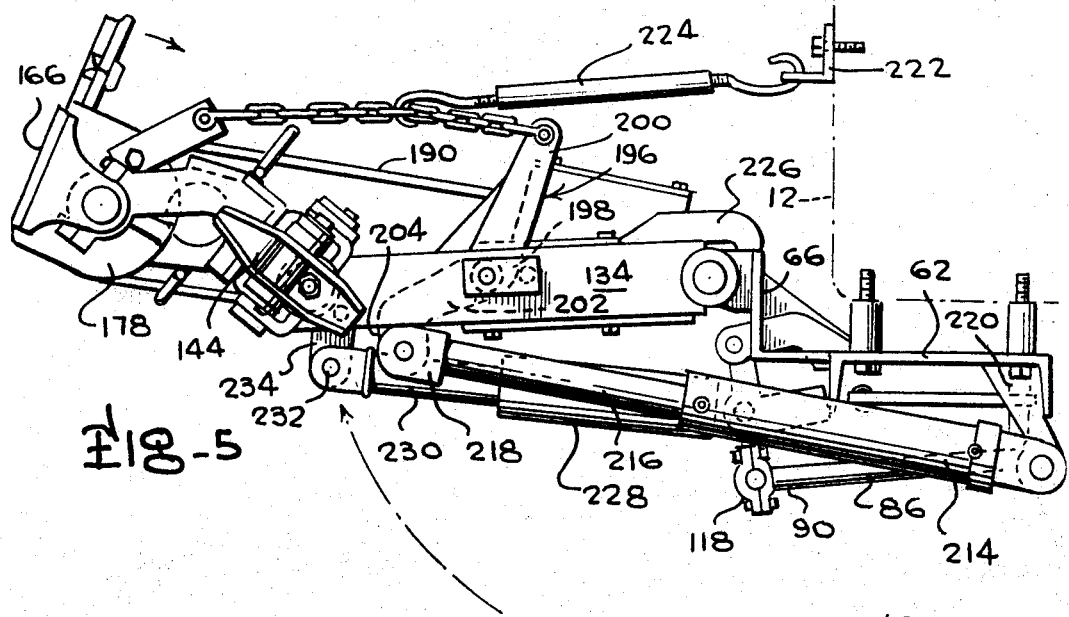
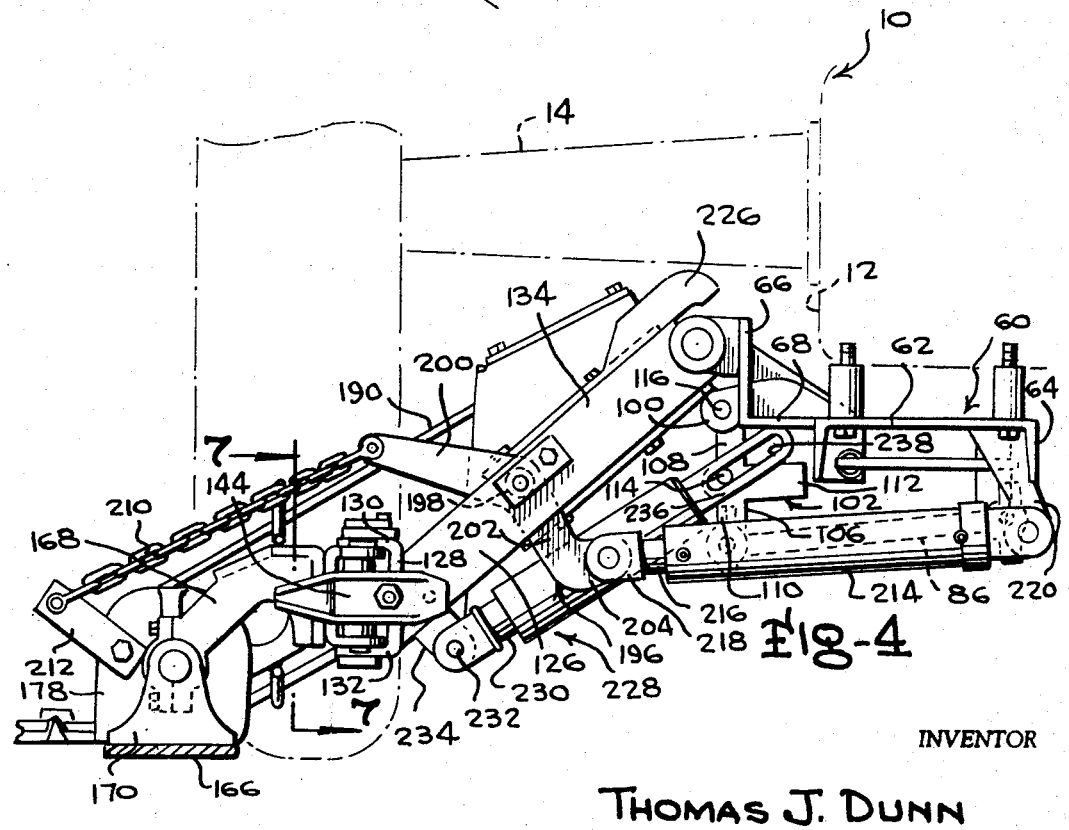
INVENTOR
THOMAS J. DUNN
BY Robert G. McMorrow
ATTORNEY Oct. 14, 1969    T. J. DUNN    3,472,006

MOWING APPARATUS

Filed Jan. 24, 1967    6 Sheets-Sheet 5

INVENTOR

THOMAS J. DUNN

BY Robert G. McMorrow
ATTORNEY

Oct. 14, 1969  T. J. DUNN  3,472,006
MOWING APPARATUS
Filed Jan. 24, 1967  6 Sheets-Sheet 6
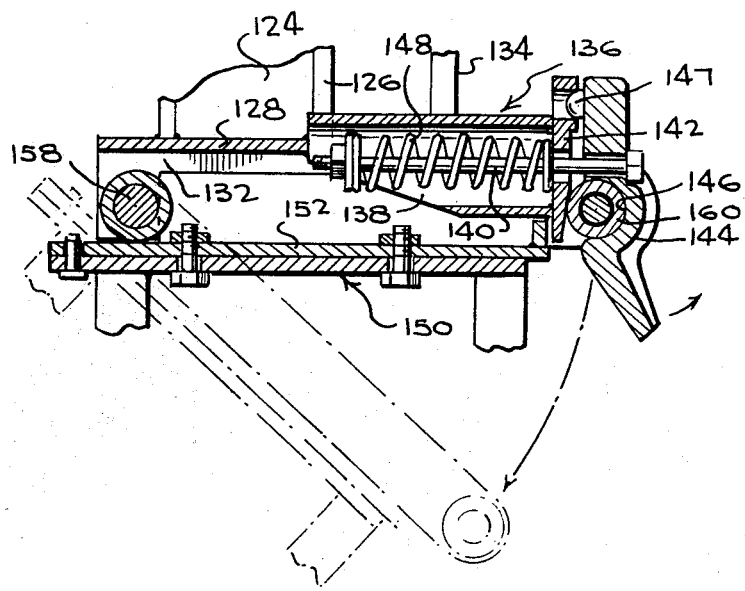
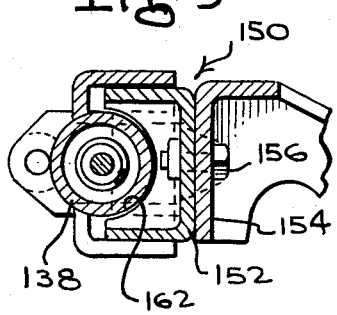
INVENTOR
THOMAS J. DUNN
BY Robert G. McMorrow
ATTORNEY

United States Patent Office 3,472,006
Patented Oct. 14, 1969

3,472,006
MOWING APPARATUS
Thomas J. Dunn, P.O. Box 110,
Hackettstown, N.J. 07840
Filed Jan. 24, 1967, Ser. No. 611,338
Int. Cl. H01d 75/18
U.S. Cl. 56—25                                    8 Claims

ABSTRACT OF THE DISCLOSURE

A cutter-bar type mower for use with a tractor, the mower having a mount including a latch and pivot yieldable upon striking an obstruction and relocated in operational position through movement of a hydraulic cylinder. The mower mount includes means for balancing of the cutter bar regardless of its angular inclination.

BACKGROUND OF THE INVENTION

Field of the invention

This invention relates to said mounted cutting apparatus of the type including reciprocating teeth movable across fixed plates as employed generally in mowing grass or the like.

Description of the prior art

Representative prior patents in the field of mowers of the general type hereinbefore set forth include Dunn et al., Patent No. 2,729,044, dated Jan. 3, 1956, and Dunn Patent No. 2,794,311, dated June 4, 1957. Essentially, the prior art has shown the desirability of yieldable mounting of cutter-bar type mowers—various mechanical expedients having been proposed as solutions to the problem encountered in the fixed mounting of this apparatus. All of the previously attempted solutions have encountered difficulty in the relocation of the cutter bar following a dislocation occasioned by striking an obstacle.

In addition, it has heretofore been conventional procedure to mount the cutter-bar assembly through the prime mover by means which include a tension balance spring. Such springs are effective only when the cutter-bar is in the fully lowered position and not when held at other inclinations as for example when mowing a grade or elevated curb.

SUMMARY OF THE INVENTION

The present invention comprises mowing apparatus mounted on the side of a prime mover and having a new and novel breakaway spring mounting combined with a unique balance assembly.

A basic objective of the present invention resides in the provision of mowing apparatus comprising a mount assembly having lift apparatus employed in raising the cutter-bar assembly thereof to a transport position, and having a hinged breakaway mount. The arrangement hereof is such that noncomplex manipulation of the lift apparatus is effective to return the assembly to its operating position following disengagement. It is therefore unnecessary to readjust or realign the assembly other than by normal operation of the lift apparatus.

A related objective of primary importance resides in providing an adjustment means for mounting the cutter bar at selected inclinations with respect to the prime mover, said adjustment means including balancing apparatus effective at any selected inclination of the cutter bar.

Additional objectives of the invention include the provision of a cutter-bar mount of the heavy-duty type which permits yielding of the bar upon encountering an obstruction but which is of relatively uncomplicated construction and assembly, and one which is adapted for operation without extensive training of the operator.

Additional objects and advantages will appear more fully hereinafter.

BRIEF DESCRIPTION OF THE DRAWING

FIGURE 2 is a rear elevational view of the mount and drive mechanism as seen from an intermediate location in FIGURE 1;

FIGURE 3 is a bottom plan view from the approximate plane of the line 3—3 of FIGURE 2, looking in the direction of the arrows;

FIGURE 4 is a front elevational view;

FIGURE 5 is a view similar to FIGURE 4, showing the components in a different operating position;

FIGURE 8 is a further detail sectional view, here taken on the line 8—8 of FIGURE 7, looking in the direction of the arrows; and FIGURE 9 is still another detail view taken on the section line 9—9 of FIGURE 7, looking in the direction of the arrows.

DESCRIPTION OF THE PREFERRED EMBODIMENT

Figure 1:
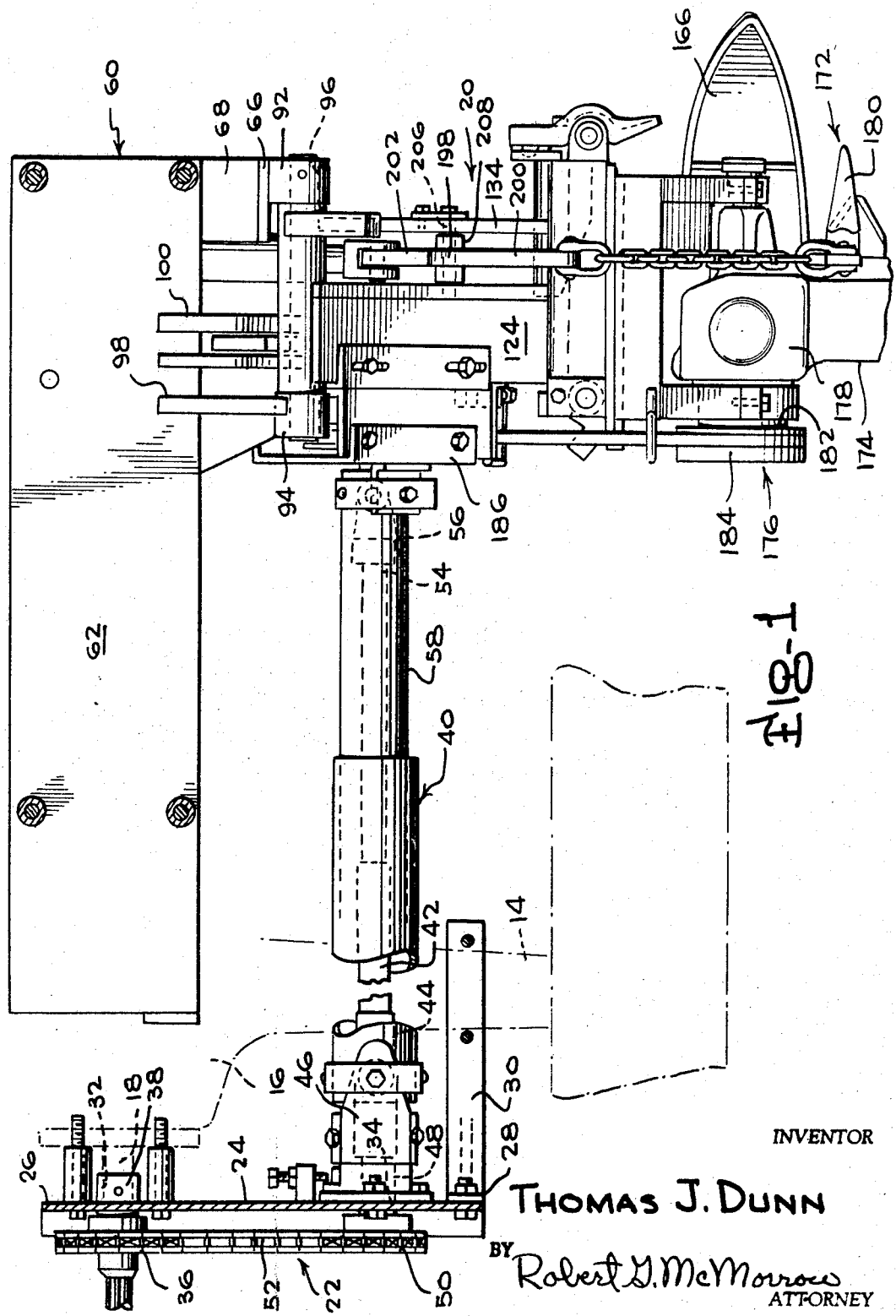
FIGURE 1 is a foreshortened top plan view, portions of the cutter bar being omitted, of mowing apparatus in accordance with the present invention.

The present apparatus finds its normal environment of use in association with a prime mover such as a tractor 10 of optional design and type having some type of side frame 12. In the illustrated form of the invention, the tractor has a rear tractor housing 14 with a central differential gear housing 16 having a rearwardly projecting power takeoff shaft 18.

Referring initially to FIGURE 1 of the drawing, it will therein be observed that the mowing apparatus 20 of the present invention includes a power takeoff engagement assembly 22 having an elongated bracket plate 24 as its basic component. A first end 26 of the plate is secured by suitable fastening means, provided with spacers of appropriate length, to the housing 16 while the opposite end 28 of the plate is secured by an extended clamp 30 to the axle housing 14. The plate has an opening 32 formed therein adjacent its end 26 and an opening 34 intermediate its ends. A sprocket 36 has a bearing 38 connected through the opening 32 with the power takeoff shaft 18.

A further assembly hereof comprises the drive shaft components 40 again best shown in FIGURE 1. The drive shaft per se is identified by reference character 42 and may be of sectional form for variance in length to adapt it to different prime movers. Shaft 42 has a drive end 44 secured to a clevis assembly 46. A stub axle 48 projects from the clevis through the opening 34 whereat it is secured to a second sprocket 50. A drive chain 52 connects the first and second sprocket to impart rotary movement to the shaft 42 from the power takeoff shaft 18. The shaft 42 further includes a second end 54 with a clevis 56 thereon—the connection of which is described more fully below. A telescopically extensible cover 58 for the shaft serves to enclose the same.

Mounting of the apparatus 20 to the side frame 12 of the tractor is accomplished by a subframe 60. The subframe mounting is shown in FIGURES 1, 3 and 4 wherein it will be observed that it includes an elongated plate element 62 with forward rear depending flanges 64 and a lateral upstanding wall 66 on an extension 68. The plate is secured to the side frame 12 by fasteners with spacers of appropriate length, and its underside is best seen in FIGURE 3. A bracket 70 extends from the rear flange 64 in spaced relation to the underside of the plate and a bell crank lever 72 is pivoted thereto at the junction 74 of its elongated first arm 76 and its right angular second arm 78. An elongated spring 80 is connected at one end to the first arm and has a length adjustment rod 82 connected to its other end and to an end flange 84 on the plate 62.

The maintenance of balance of the mower assembly involves, inter alia, a drag link 86 having an inboard end 88 connected to the second arm 78 of the bell crank, and having an outboard end 90, described in more detail below.

Figure 6:
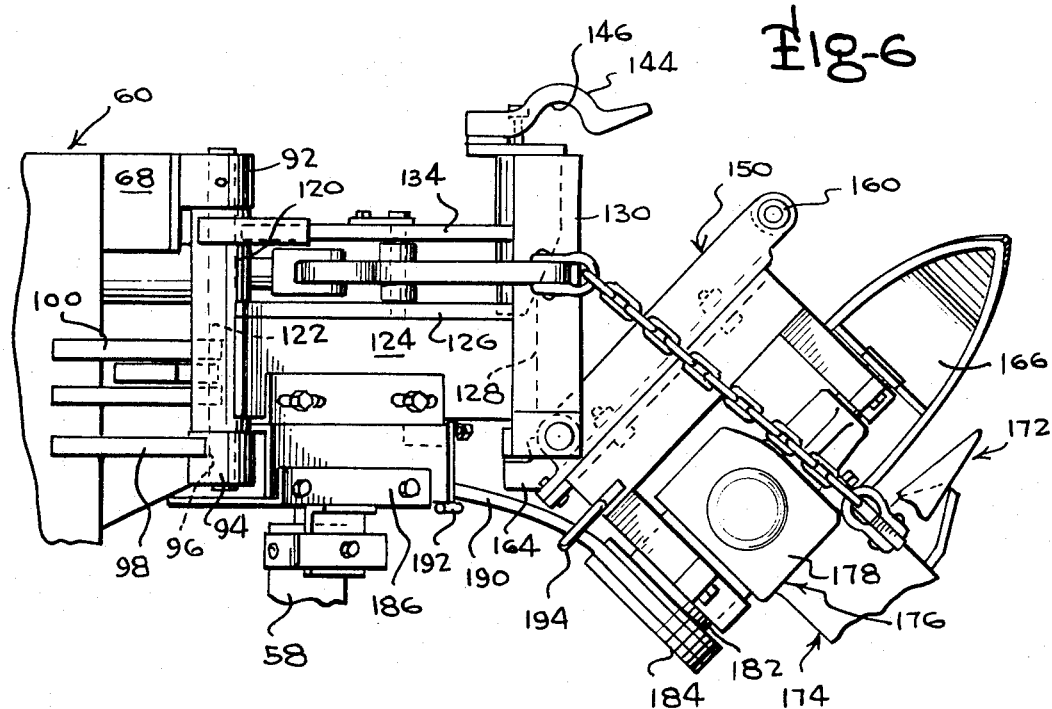
FIGURE 6 is a top plan view showing the cutter bar in its breakaway location.
Figure 7:
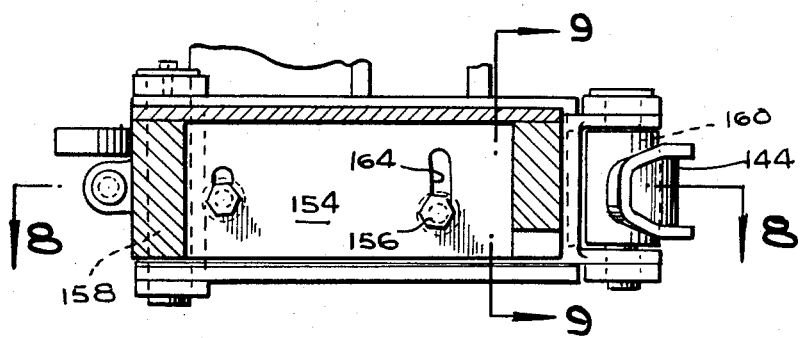
FIGURE 7 is an enlarged, detail cross sectional view, taken substantially on the line 7—7 of FIGURE 4, looking in the direction of the arrows.

In FIGURES 1 and 6, spaced apart support arms 92 and 94 with horizontally aligned sleeve openings 96 therein are shown. The latter include a support element 98, and both are spaced somewhat above the general flatwise extent of the sub frame 60 and outwardly of the tractor. Intermediate the arms 92 and 94 is a pair of support fingers 100. A T-lever 102 is secured pivotally between said fingers. The T-lever (FIGURE 4) has a normally vertical arm 106 with an upper end 108 and lower end 110, and has a perpendicular branch 112 extended in an outward direction. A stud 114 projects outwardly adjacent said branch. The upper end 108 of the T-lever is pivotally suspended between the fingers 100 on a cross bolt 116 and the lower end 110 is connected via a clamp 118 to the outward end 90 of the drag link 86. Thus, referring again to FIGURE 3, it will be seen that any movement of the T-lever is restrained by the damping effect of the drag link, the bell crank lever, and the spring 80.

A carriage for the apparatus includes an elongated, substantially tubular main sleeve member 120 connected on an axle 122 extended horizontally through the openings 96 of the arms 92 and 94, thus to form a horizontal pivot for the carriage. A substantially rectangular rigid carriage member 124 is fixed to the sleeve 120 and is pivoted therewith, the member having a side wall 126 and an elongated forward wall 128. The wall 128, best seen in FIGURES 6 and 8, has a top plate 130 and at least a partial bottom plate 132. A pivot stop bar 134 extends from the main sleeve and further supports the wall 128 being pivotal therewith. Latch means 136 is mounted forwardly of the bar 134 on the leading end of the wall 128. The latch means includes a housing 138 with a bolt 140 extended thereinto through a leading side hinge plate 142. The bolt also engages a hook member 144 with a vertically indented portion 146, hinged to the plate at 147, and has a captive spring 148 within the housing constantly urging the hook member 144 in the direction of the hinge plate.

A pivot plate 150, including an inner plate 152 and outer plate 154 connected thereto by changeable fasteners 156, is mounted by a hinge 158 at the trailing end of the wall 128. The plate 150 has a roller 160 at its leading end, which, as shown in FIGURE 8, is engageable in the indented portion 146 of the latch 144 to thereby maintain the pivot plate in flush engagement with the wall 128 of the carriage. FIGURE 9 shows the indentation of the plate 152, at 162, to accommodate the spring housing 138. The inclination of the sections 152 and 154 to one another is variable by virtue of the slots 164 in the latter. As shown in FIGURE 3, the pivot plate 150 has a trailing portion 164 serving to limit its pivotal breakaway mount about its vertical axis on the pivot hinge 158. This limit position is shown in FIGURE 6.

The cutter-bar assembly hereof is largely of optional design and construction, but in the preferred embodiment, it includes an inboard shoe 166. The shoe is secured to the pivot plate 150 by arms 168 fixed to the outer section 154 of the plate and to brackets 170 upstanding on the shoe. For purposes of reference hereinafter, the cutter-bar assembly has a leading end 172 and a trailing end 174.

The cutter-bar drive means 176 of the illustrated embodiment of the invention comprises a housing 178 with components therein of conventional type for reciprocating the teeth 180 of the bar. A tube 182 is affixed to one side of the housing and has a cutter bar pulley wheel 184 operatively mounted on its outer side. Mounted on the carriage member 124 is a bracket 186 with a drive shaft pulley wheel 188 operatively mounted therein and engaged for rotation with the drive shaft 42 at its clevis joint 56. A belt 190 connects the wheels 188 and 184. In FIGURES 2 and 6 it is to be noted that belt keeper guides 192 and 194 are secured to the bracket 186 and tube 182, respectively. The belt passes through the guides which serve to prevent its disengagement from the wheels when the cutter bar experiences a breakaway cycle of operation.

In FIGURES 5 and 6, a cutter-bar pivot lever 196 hereof is shown in two extreme operational positions. The lever has a central portion 198, a distal end section 200 and an oppositely angled proximal end section 202 with a rebent end 204. The lever is pivoted, at its central section 198, on a pin 206 with a suitable bushing 208 between the stop bar 134 and the side wall 126 of the carriage member 124. The distal end section 200 is connected to a chain 210, the outer end of which is anchored to a connector 212 on the housing 178. It is important that the connection of the chain be adjacent the forward or leading end 172 of the cutter bar.

Actuation of the pivot level 196 is here through the medium of a bar lift hydraulic cylinder 214 having an extendable portion 216 connected by a clevis 218 to the end 204 of the lever. The opposite end of the cylinder is pivotally mounted on a leg 220 depending from the inboard side of the subframe 60. As shown in FIGURE 5, a hook 222 may be mounted on the tractor side 12 whereby a turnbuckle 224 is employed to maintain the unit in transport position. The stop bar 134 has a stop lug 226 thereon which contacts the top of the flange 66 when the cylinder 214 is extended to thereby limit the upward inclination of the cutter-bar.

A final important component of the invention is a curb lift hydraulic cylinder 228. The cylinder 228 has an extendable arm 230 pivoted at 232 to a link 234. The opposite end of the curb lift cylinder has a connection arm 236 thereon with an elongated slot 238 therein in which the stud 114 of the T-lever 102 is slidably positioned.

Operation of the apparatus which will be apparent from the foregoing concerns the transmission of power to the mower through the mechanical drive described, that is, from the power take-off shaft 18 through the sprocket and chain drive to the main drive shaft 42 and thereafter through the pulley wheels 184 and 186 driven by the belt 190 to the conventional cutter-bar reciprocation means 176. Regardless of the angular position in a vertical plane perpendicular to the fore and aft axis of the tractor, the cutter bar, upon striking an obstruction, is free to break away about the relatively vertical axis of the hinge 158 which disengages the roller 160 from the indentation 146 of the latch 44. The extent of break-away is sufficient to avoid damage to the mower or more serious consequences in possible turnover of the tractor. To close and relatch the bar it is only necessary to operate the bar lift cylinder, thereby causing the lever 196 to bring the cutter bar to the upper limit of its lift rotation whereat further travel of the lever swings the bar about its breakaway axis until it is relatched. This is due, in large part, to the mechanical advantage obtained by securing the chain on the forward or leading end of the cutter bar.

In the prior art, balance springs have been used to reduce the weight of the cutter bar as it bears on the ground. In all mowers heretofore known, this device is effective only if the inner shoe is resting on relatively the same ground as that on which the tractor stands. It is desirable to reduce the weight of the mower as measured at the inner shoe at various distances above the ground. Therefore, the net effect of the spring-bell crank-drag link-T bar-curb stop cylinder, applied against the pin 232 carries a predetermined amount of the mower weight. The member 112 limits the rearward position of the pin 114. Therefore, regardless of the angular inclination of the carriage 124, the balance spring as indicated in FIGURE 4, effectively stabilizes the cutter bar at the desired inclination.

Having described and illustrated an embodiment of this invention in some detail, it will be understood that this description and illustration have been offered only by way of example, and that the invention is to be limited in scope only by the appended claims.

I claim:

1. Mowing apparatus attached to a prime mover comprising:
   a frame assembly secured to the prime mover;
   a mower carriage mounted on the frame and arranged for pivotal movement on a substantially horizontal axis with respect to the frame;
   a pivot plate assembly secured to the carriage and adapted for pivotal movement on a substantially vertical axis relative to the carriage;
   a cutter-bar assembly secured to the pivot plate assembly;
   means for effecting the pivotal movement of the mower carriage;
   balance linkage means interconnecting the mower carriage and the frame assembly, including lever means with at least two angularly related arms; and
   spring means connecting one of said arms to the frame and linkage means connecting the other of said arms to the carriage.

2. Mowing apparatus attached to a prime mover comprising:
   a frame assembly secured to the prime mover;
   a mower carriage mounted on the frame and arranged for pivotal movement on a substantially horizontal axis with respect to the frame;
   a pivot plate assembly secured to the carriage and adapted for pivotal movement on a substantially vertical axis relative to the carriage;
   a cutter-bar assembly secured to the pivot plate assembly;
   means for effecting the pivotal movement of the mower carriage;
   a balance linkage means interconnecting the mower carriage and the frame assembly;
   the linkage means including a bell crank lever having angularly related arms;
   a spring connecting one of the arms to the frame; and
   a drag link connecting the other of the arms to the mower carriage.

3. The invention of claim 2, and:
   latch means normally retaining the pivot plate assembly in engagement with the mower carriage and disengageable upon the encountering of an obstruction by the cutter-bar assembly.

4. The invention of claim 3, and:
   means controlled from the prime mover for reengagement of the latch means.

5. The invention of claim 4, wherein:
   said last named means comprise a bar lift cylinder for mower carriage.

6. The invention of claim 5, and:
   a pivot lever having a central portion pivotally connected on the mower carriage;
   the pivot lever having distal and proximal ends;
   the distal end being secured by a flexible connector to a leading end of the cutter-bar assembly; and
   the proximal end of the pivot lever being connected to the bar lift cylinder.

7. The invention of claim 6, and:
   a curb lift cylinder having one end slidably connected to linkage secured to the drag link; and
   the opposite end of the curb lift cylinder being pivotally secured to the mower carriage.

8. Mowing apparatus for attachment to a prime mover, the prime mover having a side frame, a rear axle housing with a differential gear housing, and a power takeoff shaft extending from the differential gear housing, the mowing apparatus comprising:
   an elongated bracket plate connected at one end of the drive gear housing and having an opening therein with a power takeoff shaft extended therethrough, and secured at its other end to the axle housing;
   a sprocket on the power takeoff shaft;
   a drive shaft assembly including a stub axle, a second sprocket connected to the stub axle, an elongated shaft secured to the stub axle at one end and having an opposite end with a pulley wheel thereon, and telescopic covers on the elongated shaft;
   a drive chain connecting the first and second sprockets to rotate the drive shaft;
   a subframe secured to the prime mover side frame, the subframe including depending side flanges and a lateral wall;
   a bell crank lever having a first elongated arm and a second arm joined to the first arm at a juncture, pivoted to the subframe at said juncture;
   spring means secured to the end flange of the subframe element and to the elongated arm of the bell crank lever;
   a drag link having an inboard end secured to the second arm and having an outboard end;
   spaced apart support arms with horizontally arranged sleeves thereon extending from the subfarame outwardly of the prime mover;
   a pair of support fingers projecting from the subframe and interposed between the arms;
   a T-lever, including an arm portion with an upper end and a lower end and a branch perpendicular to the arm, pivoted at its upper end between the support fingers and at its lower end to the outboard end of the drag link, the T-lever having a stud projecting therefrom adjacent the branch;
   an elongated main sleeve positioned on an axle, the axle extending through the main sleeve and through the horizontal sleeves of the support arms for pivoting of the main sleeve about a horizontal axis;
   a substantially rectanguar carriage member extending from the main sleeve and having an outer end, and a side wall;
   an elongated carriage wall of substantially U-shaped section having a main portion secured to the outer end of the carriage member in a normally vertical position and having upper and lower outward plates, the carriage wall having a leading end and a trailing end;
   a pivot stop bar extending from the main sleeve to the carriage side wall and substantially parallel thereto;
   a pivot plate mounted for limited pivotal movement about a vertical axis adjacent the trailing end of the carriage wall and having a forward portion with a cylindrical roller thereon;
   latch means, including a hook member engageable with the roller and a spring assembly normally retaining the hook about the roller with the pivot plate parallel to and engaged against the carriage wall;
   a cutter-bar assembly including an inboard shoe and leading and trailing ends and an inclined arm securing the shoe to the pivot plate;
   cutter-bar drive means including the bracket securing the pulley wheel of the drive shaft assembly on the carriage member, a drive assembly on the shoe with a cutter bar pulley wheel, and a belt drivingly connecting the pulley wheels for actuation of the cutter bar assembly;

a cutter-bar pivot lever having a central portion, a distal end section and a proximal end section, the central section being pivoted between the carriage member and pivot stop bar;

an extensible hydraulic bar lift cylinder secured to the subframe and to the proximal end section of the pivot lever;

chain means extending from the leading end of the cutter bar and connected to the distal end section of the pivot lever whereby extension and retraction of the hydraulic cylinder is effected to pivot the cutter bar about its said horizontal pivot axis for raising and lowering the same;

a stop lug on the pivot stop bar arranged to contact the main sleeve at a desired inclination of the cutter bar; and the curb lift hydraulic cylinder including a connection arm having an elongated slot therein, the stud of the T-lever being engaged in said slot, a tube secured to the connection arm, and an extensible rod pivotally connected to the link depending from the carriage member whereby the operating inclination of the cutter bar is controlled by the extension and retraction of the extensible rod.

References Cited

UNITED STATES PATENTS

| | | | |
|---|---|---|---|
| 2,663,133 | 12/1953 | Davis | 56—25 |
| 2,743,568 | 5/1956 | Elfes | 56—25 |
| 2,757,504 | 8/1956 | Elfes et al. | 56—25 |
| 2,828,598 | 4/1958 | Anderson et al. | 56—25 |
| 2,840,974 | 7/1958 | Dunn et al. | 56—25 |
| 2,917,889 | 12/1959 | Vutz | 56—25 |
| 3,031,829 | 5/1962 | Johnson et al. | 56—25 |

RUSSELL R. KINSEY, Primary Examiner